(12) United States Patent
Tejpal

(10) Patent No.: US 12,037,939 B2
(45) Date of Patent: Jul. 16, 2024

(54) DYNAMIC OPTIMIZATION OF SYSTEM EFFICIENCY FOR AN INTEGRATED HYDROGEN-ELECTRIC ENGINE

(71) Applicant: ZeroAvia, Ltd., Cirencester (GB)

(72) Inventor: Ritish Tejpal, Santa Cruz, CA (US)

(73) Assignee: ZeroAvia, Ltd., Cirencester (GB)

( * ) Notice: Subject to any disclaimer, the term of this patent is extended or adjusted under 35 U.S.C. 154(b) by 240 days.

(21) Appl. No.: 17/657,358

(22) Filed: Mar. 30, 2022

(65) Prior Publication Data
US 2022/0333527 A1 Oct. 20, 2022

Related U.S. Application Data

(60) Provisional application No. 63/169,519, filed on Apr. 1, 2021.

(51) Int. Cl.
*F02C 6/20* (2006.01)
*F02C 9/00* (2006.01)

(52) U.S. Cl.
CPC . *F02C 6/20* (2013.01); *F02C 9/00* (2013.01)

(58) Field of Classification Search
CPC ...... F02C 6/20; F02C 9/00; F02C 9/28; B60L 58/40; B60L 2220/42; B60L 2240/423; B60L 15/2045; G05B 13/0205; Y02T 90/40
See application file for complete search history.

(56) References Cited

U.S. PATENT DOCUMENTS

| | | | | |
|---|---|---|---|---|
| 11,639,114 B2 * | 5/2023 | Vallbracht | ................. | H02P 5/00 318/51 |
| 2002/0005454 A1 * | 1/2002 | MacCready | .............. | B64C 1/26 244/5 |
| 2009/0293494 A1 * | 12/2009 | Hoffjann | ................ | B64D 27/02 60/718 |
| 2010/0004090 A1 * | 1/2010 | Mizutani | ............. | B60L 15/2036 477/7 |
| 2017/0175565 A1 * | 6/2017 | Sennoun | ................... | F02C 6/14 |
| 2018/0304753 A1 * | 10/2018 | Vondrell | ................... | F02K 3/04 |
| 2021/0151783 A1 * | 5/2021 | Miftakhov | ........ | H01M 8/04738 |

OTHER PUBLICATIONS

Zhixing Ji et al, Comparative performance analysis of solid oxide fuel cell turbine-less jet engines for electric propulsion airplanes: Application of alternative fuel (2019), Aerospace Science and Technology, vol. 93 (Year: 2019).*

* cited by examiner

*Primary Examiner* — Jason H Duger
(74) *Attorney, Agent, or Firm* — Osha Bergman Watanabe & Burton LLP

(57) ABSTRACT

A system and method for dynamic optimization of system efficiency for an integrated hydrogen-electric engine is disclosed. The system includes an elongated shaft of an integrated hydrogen-electric engine and a plurality of motors to drive the elongated shaft of the integrated hydrogen-electric engine. The system also includes at least one sensor to monitor a first torque of each motor of the plurality of motors and a computer with a memory and one or more processors. The one or more processors receive from the sensor, a first set of torque data for the first torque of each motor of the plurality of motors, utilize the first set of torque data to determine an overall efficiency of the plurality of motors, and selectively idle at least one motor of the plurality of motors based on a result of the determination.

20 Claims, 6 Drawing Sheets

DYNAMIC OPTIMIZATION OF SYSTEM EFFICIENCY FOR AN INTEGRATED HYDROGEN-ELECTRIC ENGINE

CROSS-REFERENCE TO RELATED APPLICATIONS (PROVISIONAL)

This application claims priority to and benefit of U.S. Provisional Patent Application No. 63/169,519 filed on Apr. 1, 2021, entitled "DYNAMIC OPTIMIZATION OF SYSTEM EFFICIENCY FOR AN INTEGRATED HYDROGEN-ELECTRIC ENGINE" by Ritish Tejpal, and assigned to the assignee of the present application, the disclosure of which is hereby incorporated by reference in its entirety.

FIELD OF THE INVENTION

Embodiments of the present technology relate generally to clean energy-based air propulsion systems, and more particularly, to systems and methods for dynamic optimization of system efficiency for integrated hydrogen-electric systems such as for aircraft transportation systems.

BACKGROUND

In air propulsion systems that use multiple motors, there are use cases where the multiple motors may be operating at inefficient operating points. The inefficient operation of the multiple motors may waste energy. Accordingly, systems and methods are needed for dynamic optimization of system efficiency for integrated hydrogen-electric systems.

BRIEF DESCRIPTION OF THE DRAWINGS

Aspects of the present invention are illustrated by way of example, and not by way of limitation, in the accompanying drawings, wherein.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

Hydrogen-electric engine systems are disclosed herein as an example use of the system for fuel cell management. However, it should be appreciated that in another embodiment, other systems with different types of fuel cells may be used in conjunction with or in place of one or more of the Hydrogen and/or electric engine systems.

Figure 1:
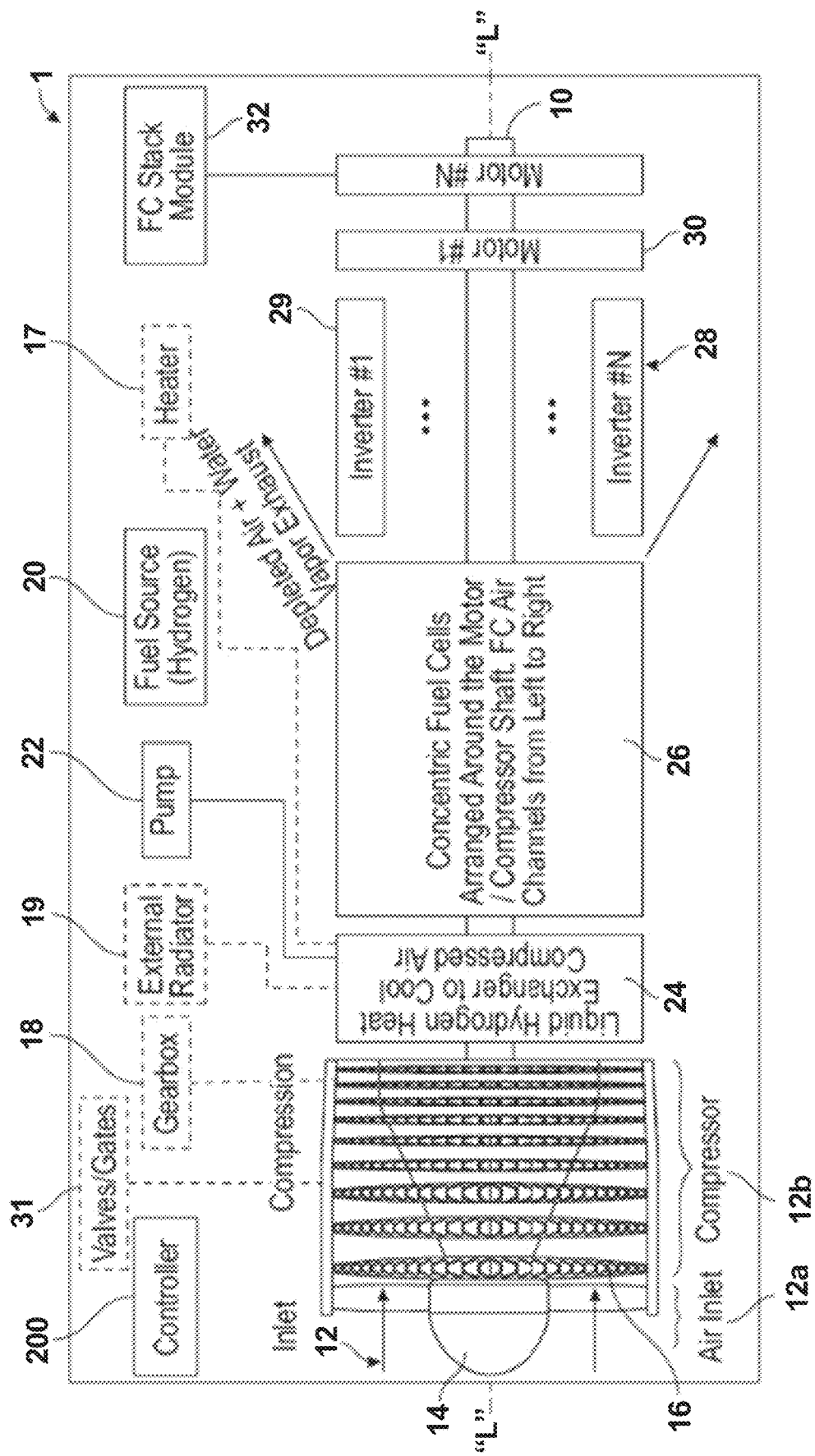
FIG. 1 is a schematic view of an integrated hydrogen-electric engine system, in accordance with an embodiment.

FIG. 1 illustrates an integrated hydrogen-electric engine system 1 that can be utilized, for example, in a turboprop or turbofan system, to provide a streamlined, lightweight, power-dense, and efficient system. In general, integrated hydrogen-electric engine system 1 includes an elongated shaft 10 that defines a longitudinal axis "L" and extends through the entire powertrain of integrated hydrogen-electric engine system 1 to function as a common shaft for the various components of the powertrain. Elongated shaft 10 supports propulsor 14 (e.g., a fan or propeller) and a multi-stage air compressor system 12, a pump 22 in fluid communication with a fuel source (e.g., hydrogen), a heat exchanger 24 in fluid communication with air compressor system 12, a fuel cell stack 32 in fluid communication with heat exchanger 24, and a motor assembly 28 disposed in electrical communication with the fuel cell stack 32.

Air compressor system 12 of integrated hydrogen-electric engine system 1 includes an air inlet portion 12a at a distal end thereof and a compressor portion 12b that is disposed proximally of air inlet portion 12a for uninterrupted, axial delivery of airflow in the proximal direction. Compressor portion 12b supports a plurality of longitudinally spaced-apart rotatable compressor wheels 16 (e.g., multi-stage) that rotate in response to rotation of elongated shaft 10 for compressing air received through air inlet portion 12a for pushing the compressed air to a fuel cell stack 32 for conversion to electrical energy. As can be appreciated, the number of compressor wheels/stages 16 and/or diameter, longitudinal spacing, and/or configuration thereof can be modified as desired to change the amount of air supply, and the higher the power, the bigger the propulsor 14. These compressor wheels 16 can be implemented as axial or centrifugal compressor stages. Further, the compressor can have one or more bypass valves and/or wastegates 31 to regulate the pressure and flow of the air that enters the downstream fuel cell, as well as to manage the cold air supply to any auxiliary heat exchangers in the system.

Compressor system 12 can optionally be mechanically coupled to elongated shaft 10 via a gearbox 18 to change (increase and/or decrease) compressor turbine rotations per minute (RPM) and to change the airflow to fuel cell stack 32. For instance, gearbox 18 can be configured to enable the airflow, or portions thereof, to be exhausted for controlling a rate of airflow through the fuel cell stack 32, and thus, the output power.

Integrated hydrogen-electric engine system 1 further includes a gas management system such as a heat exchanger 24 disposed concentrically about elongated shaft 10 and configured to control thermal and/or humidity characteristics of the compressed air from air compressor system 12 for conditioning the compressed air before entering fuel cell stack 32. Integrated hydrogen-electric engine system 1 further also includes a fuel source 20 of fuel cryogenic (e.g., liquid hydrogen—LH2, or cold hydrogen gas) that is operatively coupled to heat exchanger 24 via a pump 22 configured to pump the fuel from fuel source 20 to heat exchanger 24 for conditioning compressed air. In particular, the fuel, while in the heat exchanger 24, becomes gasified because of heating (e.g., liquid hydrogen converts to gas) to take the heat out of the system. The hydrogen gas then gets heated in the heat exchanger 24 to a working temperature of the fuel cell 26, which also takes heat out of the compressed air, which results in control of flow through the heat exchanger 24. In one embodiment, a heater 17 can be coupled to or included with heat exchanger 24 to increase the heat as necessary, for instance, when running under a low power regime. Additionally, and/or alternatively, motor assembly 28 can be coupled to heat exchanger 24 for looping in the cooling/heating loops from motor assembly 28 as necessary. Such heating/cooling control can be managed, for instance, via controller 200 of integrated hydrogen-electric engine system 1. In one embodiment, fuel source 20 can be disposed in fluid communication with motor assembly 28 or any other suitable component to facilitate cooling of such components.

Pump 22 can also be coaxially supported on elongated shaft 10 for actuation thereof in response to rotation of elongated shaft 10. Heat exchanger 24 is configured to cool the compressed air received from air compressor system 12 with the assistance of the pumped liquid hydrogen.

Figure 2:
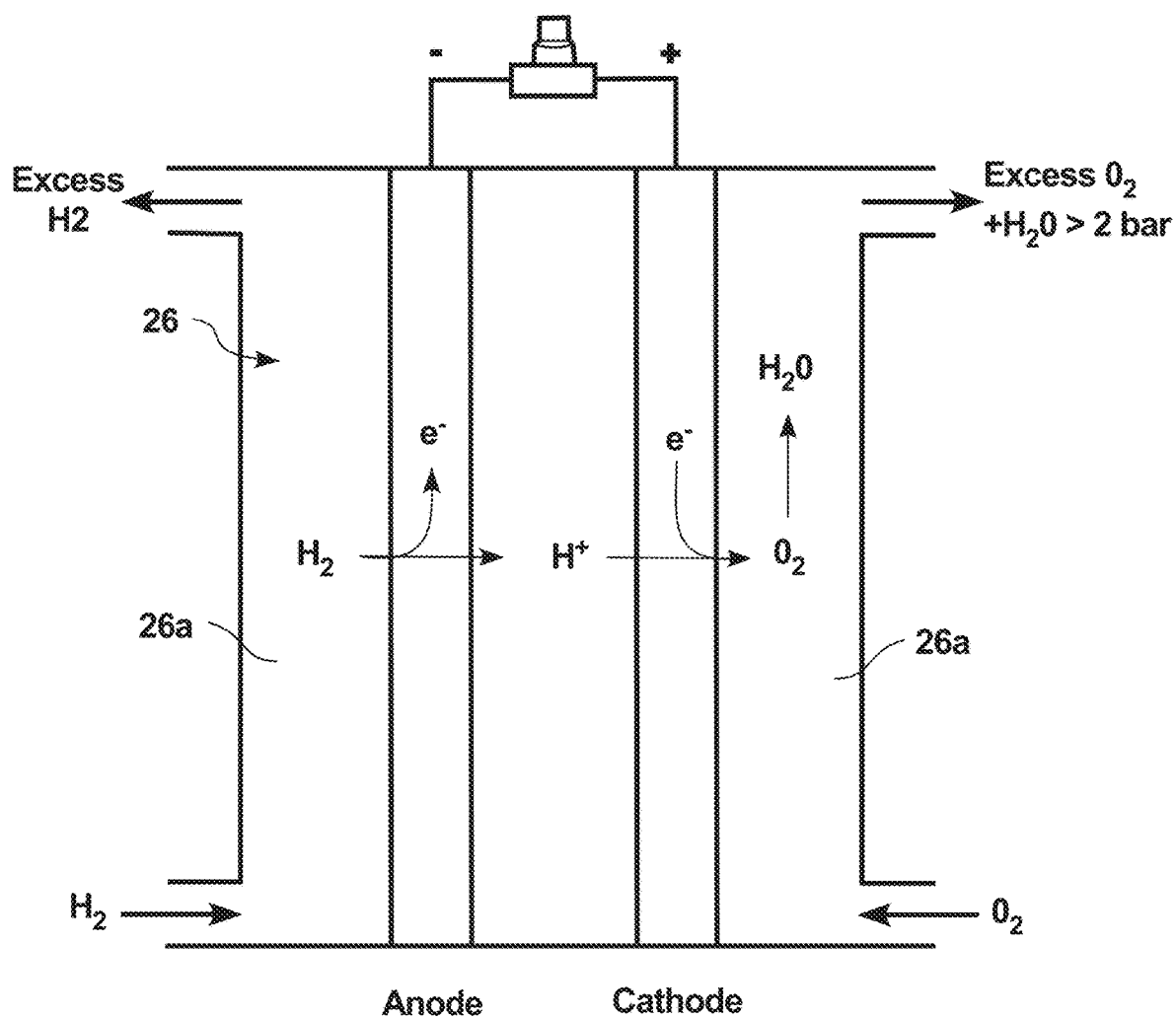
FIG. 2 is a schematic view of a fuel cell of the integrated hydrogen-electric engine system of FIG. 1, in accordance with an embodiment.

With reference also to FIG. 2, integrated hydrogen-electric engine system 1 further includes an energy core in the form of a fuel cell stack 32, which may be circular, and is also coaxially supported on elongated shaft 10 (e.g., concentric) such that air channels 26a of fuel cell stack 32 may be oriented in parallel relation with elongated shaft 10 (e.g., horizontally or left-to-right). Fuel cell stack 32 may be in the form of a proton-exchange membrane fuel cell (PEMFC). The fuel cells of the fuel cell stack 32 are configured to convert chemical energy liberated during the electrochemical reaction of hydrogen and oxygen to electrical energy (e.g., direct current). Depleted air and water vapor are exhausted from fuel cell stack 32. The electrical energy generated from fuel cell stack 32 is then transmitted to motor assembly 28, which is also coaxially/concentrically supported on elongated shaft 10. In one embodiment, integrated hydrogen-electric engine system 1 may include any number of external radiators 19 (FIG. 1) for facilitating airflow and adding, for instance, additional cooling. Notably, fuel cell stack 32 can include liquid-cooled and/or air-cooled cell types so that cooling loads are integrated into heat exchanger 24 for reducing the total amount of external radiators needed in the system.

Motor assembly 28 of integrated hydrogen-electric engine system 1 includes a plurality of inverters 29 configured to convert the direct current to alternating current for actuating one or more of a plurality of motors 30 in electrical communication with the inverters 29. The plurality of motors 30 are configured to drive (e.g., rotate) the elongated shaft 10 in response to the electrical energy received from fuel cell stack 32 for operating the components on the elongated shaft 10 as elongated shaft 10 rotates.

Integrated hydrogen-electric engine system 1 further includes a controller 200 (e.g., a full authority digital engine (or electronics) control (e.g., a FADEC) for controlling the various embodiments of the integrated hydrogen-electric engine system 1 and/or other components of the aircraft system. For instance, controller 200 can be configured to manage a flow of liquid hydrogen, manage coolant liquids from the motor assembly 28, manage, for example, any dependent auxiliary heater for the liquid hydrogen, manage rates of hydrogen going into fuel cell stack 32, manage rates of heated/cooled compressed air, and/or various flows and/or power of integrated hydrogen-electric engine system 1. The algorithm for managing these thermal management components can be designed to ensure the most efficient use of the various cooling and heating capacities of the respective gases and liquids to maximize the efficiency of the system and minimize the volume and weight of the same. For example, the cooling capacity of liquid hydrogen or cool hydrogen gas (post-gasification) can be effectively used to cool the hot compressor discharge air to ensure the correct temperature range in the fuel cell inlet. Further, the cooling liquid from the motor-inverter cooling loop could be integrated into the master heat exchanger and provide the additional heat required to gasify hydrogen and heat it to the working fuel cell temperature.

Figure 3:
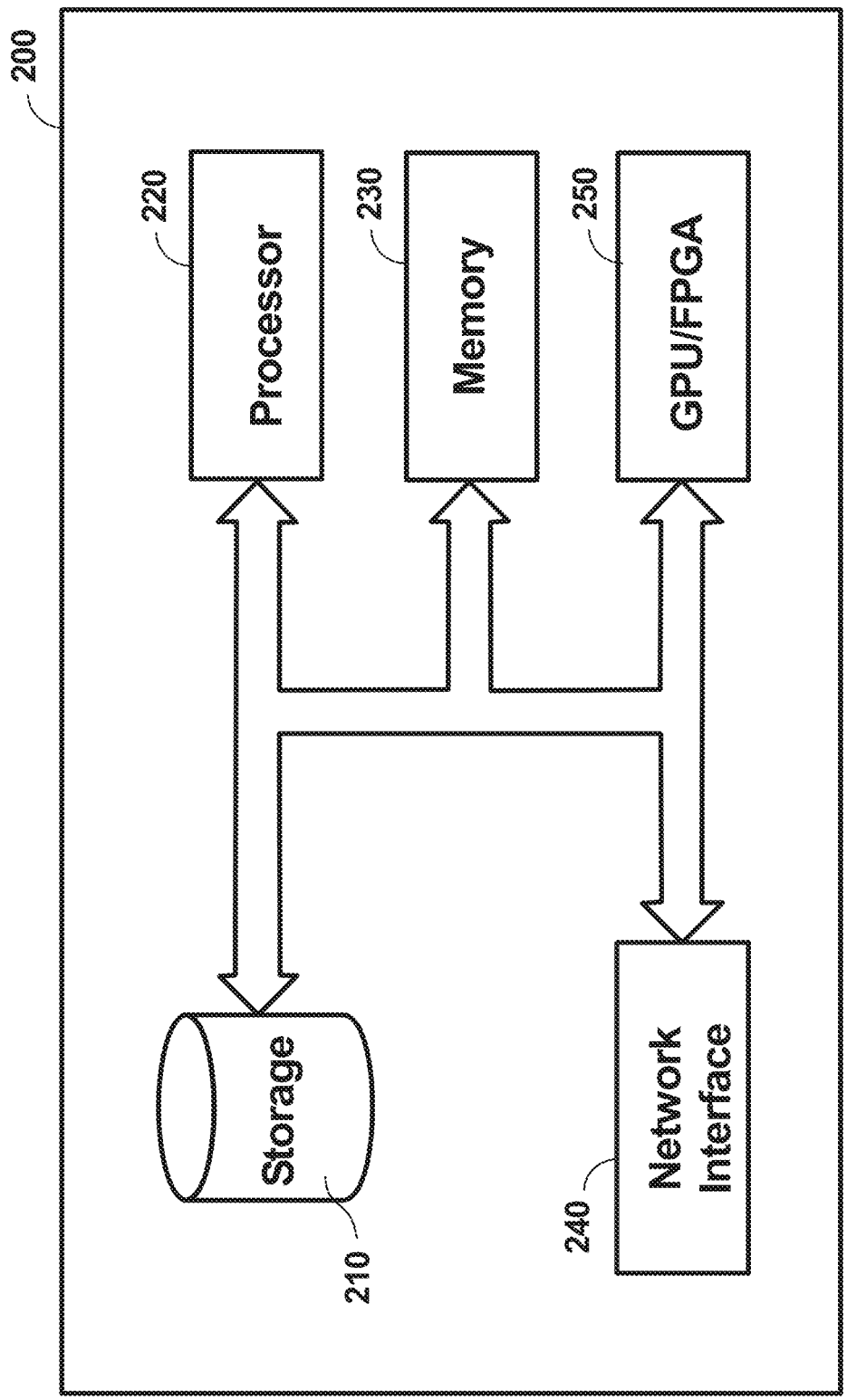
FIG. 3 is a block diagram of a controller configured for use with the integrated hydrogen-electric engine system of FIG. 1, in accordance with an embodiment.

FIG. 3 illustrates that controller 200 includes a processor 220 connected to a computer-readable storage medium or a memory 230. The computer-readable storage medium or memory 230 may be a volatile type of memory, e.g., RAM, or a non-volatile type memory, e.g., flash media, disk media, etc. In one embodiment, the processor 220 may be another type of processor such as, without limitation, a digital signal processor, a microprocessor, an ASIC, a graphics processing unit (GPU), a field-programmable gate array (FPGA), or a central processing unit (CPU). In one embodiment, network inference may also be accomplished in systems that have weights implemented as memristors, chemically, or other inference calculations, as opposed to processors.

In one embodiment, the memory 230 can be random access memory, read-only memory, magnetic disk memory, solid-state memory, optical disc memory, and/or another type of memory. In one embodiment, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In one embodiment, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

The controller 200 is configured to receive, among other data, the fuel supply status, aircraft location, and control, among other features, the pumps, motors, sensors, etc.

Further, as can be appreciated, the integrated hydrogen-electric engine system 1 can include any number and/or type of sensors, electrical components, and/or telemetry devices that are operatively coupled to controller 200 for facilitating the control, operation, and/or input/out of the various components of integrated hydrogen-electric engine system 1 for improving efficiencies and/or determining errors and/or failures of the various components.

For a more detailed description of components of similar hydrogen-electric engine systems, one or more components of which can used or modified for use with the structure of the present disclosure, reference can be made, for example, to U.S. patent application Ser. No. 16/950,735.

Figure 4:
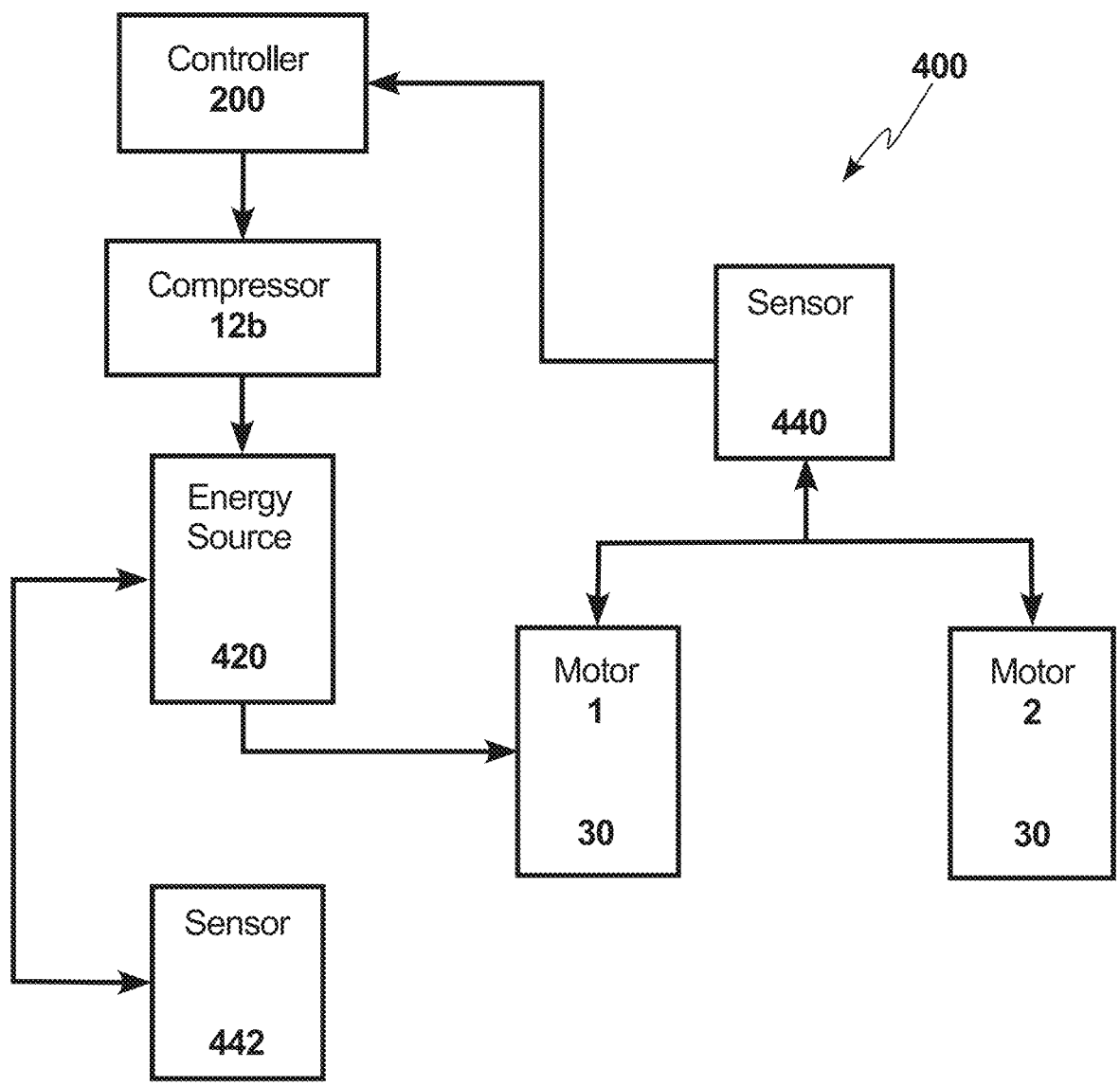
FIG. 4 is a block diagram of a system for multiple energy source management in accordance with the disclosure, in accordance with an embodiment.

Referring to FIG. 4 a system 400 for dynamic optimization of system efficiency is shown in accordance with an embodiment. The system 400 generally includes a plurality of motors 30 configured to drive an elongated shaft of an integrated hydrogen-electric engine 1 of FIG. 1, a plurality of energy sources 420 (e.g., hydrogen) configured to fuel the integrated hydrogen-electric engine 1, sensor(s) 440 configured to sense a torque of each motor of the plurality of motors 30, a controller 200 (FIG. 3), and a plurality of compressors 12*b* configured to push compressed air to the fuel cell stack 32 for conversion to electrical energy. In one embodiment, the system may further include a second sensor 442 configured to sense a power, a voltage, and/or a current of the plurality of energy sources 420.

Each of the plurality of energy sources 420 may include a fuel cell 26, a battery, or combinations thereof. For example, a first energy source 420 may include a first fuel cell 26, and a second energy source 420 may include a battery (charged by the first fuel cell 26 or another fuel cell 26). The system may include a parallel and/or a series arrangement of energy sources 420.

The sensor 440 may include a torque sensor, which is a transducer that converts a torsional mechanical input into an electrical output signal. In one embodiment, the sensor 440 may measure static torque and/or dynamic torque.

Figure 5:
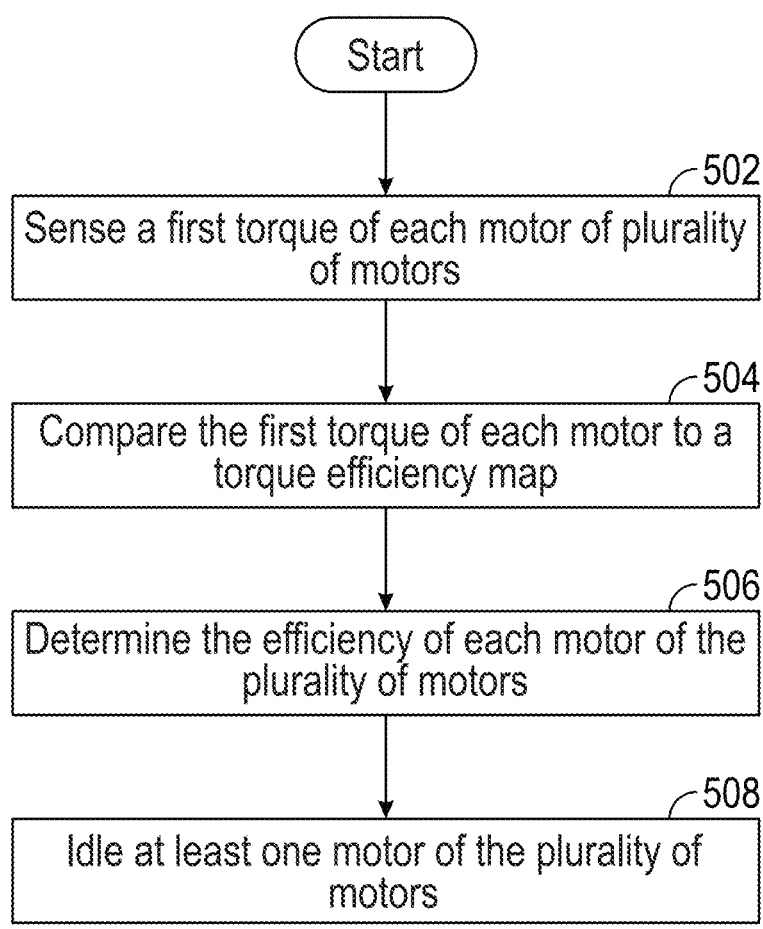
FIG. 5 is a flow diagram of a method for dynamic optimization of system efficiency for an integrated hydrogen-electric engine, in accordance with an embodiment.

Referring to FIG. 5, there is shown a flow chart of an exemplary computer-implemented method 500 for dynamic optimization of system efficiency for the integrated hydrogen-electric engine 1. Although the steps of FIG. 5 are shown in a particular order, the steps need not all be performed in the specified order, and certain steps can be performed in another order. For simplicity, FIG. 5 will be described below, with the controller 200 performing the operations. However, in another embodiment(s), the operations of FIG. 5 may be performed in part by the controller 200 of FIG. 3 and in part by another device, such as a remote server. In the example below, motors 30 are used as an example. However, the below methods may be used with any redundant power train components (e.g., compressor 12*b*) of the integrated hydrogen-electric engine 1 to improve the efficiency of the system.

Initially, at step 502, the controller 200 senses, by a sensor 440, a first torque of each motor of a plurality of motors 30 (compressors 12*b*, and/or motor assembly 28). The torque of each motor 30 may depend on how many motors 30 are in use and/or the type and/or amount of demand of the integrated hydrogen-electric engine 1. For example, the torque of the motor 30 may be a higher value if the integrated hydrogen-electric engine 1 demands more power (e.g., during an increase in altitude). In another example, the torque may be lower during descent than during an increase in altitude.

Figure 6:
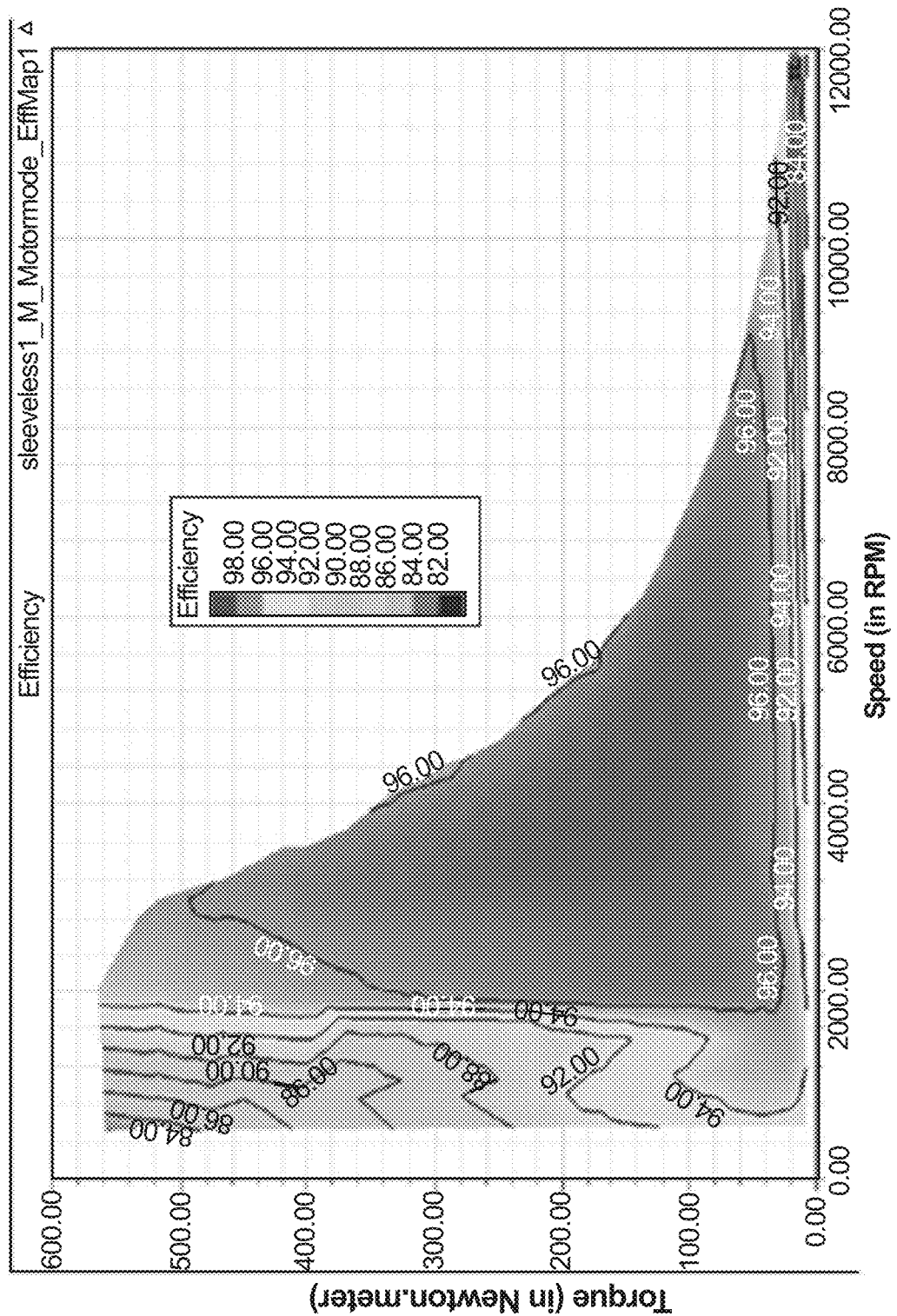
FIG. 6 is a graph of a torque efficiency map for a motor, in accordance with an embodiment.

Next, at step 504, the controller 200 compares the first torque of each motor to a torque efficiency map (FIG. 6). For example, the plurality of motors 30 may be operating at a torque of about 200 newton meters and at about a speed of 5500 rotations per minute (RPM).

Next, at step 506, the controller 200 determines the efficiency of each motor 30 of the plurality of motors 30. In one embodiment, the determined efficiency may be based on the torque efficiency map (FIG. 6). Determining the efficiency of the plurality of motors 30 may be based on the sensed first torque of each motor of the plurality of motors 30. For example, at a torque of about 200 newton meters, the controller 200 may determine that the motor 30 has an efficiency of about 80%.

In one embodiment, the controller 200 may sense the power being supplied to the motor using the second sensor 442, and the controller 200 may calculate an efficiency based on measured first torque and the measured input power to the motor 30.

In one embodiment, when determining the efficiency of the plurality of motors 30, the controller 200 may determine a second torque on the plurality of motors 30 in a case where at least one of the plurality of motors is idling. The controller 200 may compare the second torque to the first torque and determine the efficiency of each of the plurality of motors 30 based on the comparison.

In one embodiment, the efficiency may be determined by the controller 200 by dividing the electrical energy used by each motor 30 by the shaft power of each motor 30. Shaft power is the mechanical power transmitted from one rotating element of the motor to another. Shaft power may be calculated as a sum of the torque and the speed of the rotation of the shaft of the motor 30. For example, a motor with at a measured torque of 200 newton meters and a shaft speed of 5500 RPM (rotations per minute) may have a shaft power of about 1,100 kW. If the measured electrical energy is about 1,320 kW, then the efficiency of the motor 30 would be about 80%.

Next, at step 508, the controller 200 idles at least one motor 30 of the plurality of motors 30 based on the determined efficiency.

For example, the controller 200 may selectively provide power to each motor of the plurality of motors by an energy source to idle the motor 30. The energy source 420 is electrically connected to the motor 30 (and/or motor assembly 28). The second sensor 442 is configured to sense a power output from the energy source 420. The second sensor 442 may include, for example, a power sensor, a voltage sensor, and/or a current sensor. The energy source(s) 420 may include a fuel cell, a battery, and/or a fuel cell stack, and/or combinations thereof. In one embodiment, the system may include multiple energy source(s) 420 in series, parallel, and/or in combination. The controller 200 may activate the fuel cells of a fuel cell stack by turning the individual fuel cells on or off at different intervals, timing, etc. In one embodiment, the controller 200 may vary pump pressures (hydrogen and/or oxygen) (e.g., pump 22 of FIG. 1), motor speeds (e.g., motor assembly 28 which is coupled with a heat exchanger 24 of FIG. 1), fan speeds (e.g., propulsor 14 of FIG. 1), and/or turn on/off auxiliary batteries, to modify motor speeds. For example, in a case where less energy is required, the controller 200 may increase the motor speed of motor assembly 28, which is coupled with a heat exchanger 24, to increase the heat as necessary. In another example, the operation may increase or decrease the pressure from pump 22 (FIG. 1), which is in fluid communication with a fuel source 20 (e.g., hydrogen) to pump the fuel to heat exchanger 24 for conditioning compressed air. The fuel, while in the heat exchanger 24, becomes gasified because of heating to take the heat out of the system. The hydrogen gas then gets heated in the heat exchanger 24 to a working temperature of the fuel cell 26, which also takes heat out of the compressed air, which results in control of flow through the heat exchanger 24 regulating the generated amount of energy accordingly.

A benefit of the disclosed system is that energy can be saved by dynamically optimizing the system's efficiency. For example, the system may have two motors 30 each operating at a torque of about 300 newton meters at a shaft speed of 4200 RPM, which is about 1,260 kW each of shaft power. The input energy for each of the two motors 30 might be at around 1.638 kW, which means that the two motors are operating at about 70% efficiency. However, the controller 200 may determine that a single motor 30 operating at 600 newton meters at a shaft speed of about 2000 RPM (and the second motor idling), which is about 1.2 kW of shaft power, with an input energy of about 1,440 kW, which is an efficiency of about 80%.

Referring to FIG. 6, a torque efficiency map for a motor is a contour map of the motor's efficiency on axes of torque and speed. The torque efficiency map describes the maximum efficiency for any speed/torque combination and is a convenient way to represent the motor drive over a range of operating points defined by a driving cycle. The efficiency may be stored as a table in the system's memory. A motor's efficiency is a measure of a motor's ability to convert electrical energy to mechanical energy. For example, a motor with an efficiency of 80% at a specific torque will draw a specific amount of electrical power, for example about 1.25 kW for each kilowatt of shaft power it delivers.

The efficiency of a motor is load dependent. Thus, a motor, (and/or a compressor) that operates at a partial load may cause the motor to run inefficiently. For example, a motor's efficiency may begin to fall when the load on the motor drops to less than 50%. For example, the motor's efficiency may be as low as 40% when the load is 10-20%. Generally, the efficiency of a motor will increase with the load. To initiate motor rotation, electric energy in the form of current is applied to the motor windings. As rotation occurs, the current is varied, which changes the magnetic field strength. The change in magnetic field strength introduces eddy-current losses and hysteresis losses in the stator coil material (e.g., the copper windings have a resistance). There are also mechanical losses caused by rotor suspension.

It should be understood the disclosed structure can include any suitable mechanical, electrical, and/or chemical components for operating the disclosed system or components thereof. For instance, such electrical components can include, for example, any suitable electrical and/or electromechanical and/or electrochemical circuitry, which may include or be coupled to one or more printed circuit boards. As appreciated, the disclosed computing devices and/or server can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In one embodiment, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, Free-BSD, OpenBSD, NetBSD®, Linux, Apple® Mac OS X Server®, Oracle® Solaris®, Windows Server®, and Novell® NetWare®. In one embodiment, the operating system is provided by cloud computing.

In one embodiment, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In one embodiment, the controller includes a storage and/or memory device. The storage and/or memory device is one or more physical apparatus used to store data or programs on a temporary or permanent basis. In one embodiment, the controller includes volatile memory and requires power to maintain stored information. In one embodiment, the controller includes non-volatile memory and retains stored information when it is not powered. In one embodiment, the non-volatile memory includes flash memory. In one embodiment, the non-volatile memory includes dynamic random-access memory (DRAM). In one embodiment, the non-volatile memory includes ferroelectric random-access memory (FRAM). In one embodiment, the non-volatile memory includes phase-change random access memory (PRAM). In one embodiment, the controller is a storage device including, by way of non-limiting examples, CD-ROMs, DVDs, flash memory devices, magnetic disk drives, magnetic tapes drives, optical disk drives, and cloud-computing-based storage. In one embodiment, the storage and/or memory device is a combination of devices such as those disclosed herein.

In one embodiment, the memory can be random access memory, read-only memory, magnetic disk memory, solid state memory, optical disc memory, and/or another type of memory. In one embodiment, the memory can be separate from the controller and can communicate with the processor through communication buses of a circuit board and/or through communication cables such as serial ATA cables or other types of cables. The memory includes computer-readable instructions that are executable by the processor to operate the controller. In one embodiment, the controller may include a wireless network interface to communicate with other computers or a server. In one embodiment, a storage device may be used for storing data. In one embodiment, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, in one embodiment, a controller may be remote from the disclosed structure (e.g., on a remote server), and accessible by the disclosed structure via a wired or wireless connection. In one embodiment where the controller is remote, it may be accessible by, and connected to, multiple structures and/or components of the disclosed system.

The term "application" may include a computer program designed to perform particular functions, tasks, or activities for the benefit of a user. Application may refer to, for example, software running locally or remotely, as a stand-alone program or in a web browser, or other software which would be understood by one skilled in the art to be an application. An application may run on the disclosed controllers or on a user device, including for example, on a mobile device, an IoT device, or a server system.

In one embodiment, the controller includes a display to send visual information to a user. In one embodiment, the display is a cathode ray tube (CRT). In one embodiment, the display is a liquid crystal display (LCD). In one embodiment, the display is a thin film transistor liquid crystal display (TFT-LCD). In one embodiment, the display is an organic light-emitting diode (OLED) display. In one embodiment, on OLED display is a passive-matrix OLED (PMOLED) or active-matrix OLED (AMOLED) display. In one embodiment, the display is a plasma display. In one embodiment, the display is a video projector. In one embodiment, the display is interactive (e.g., having a touch screen or a sensor such as a camera, a 3D sensor, a LiDAR, a radar, etc.) that can detect user interactions/gestures/responses and the like. In one embodiment, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In one embodiment, the controller can be coupled to a mesh network. As used herein, a "mesh network" is a network topology in which each node relays data for the network. In general, mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In one embodiment, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines or sections of programs that perform a particular task.

As used herein, the controller includes software modules for managing various functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A system for dynamic optimization of system efficiency for an integrated hydrogen-electric engine, said system comprising:
    an elongated shaft of an integrated hydrogen-electric engine;
    a plurality of motors configured to drive said elongated shaft of said integrated hydrogen-electric engine;
    at least one sensor configured to monitor a first torque of each motor of said plurality of motors; and
    a computer comprising:
        a memory; and
        one or more processors, said one or more processors configured to:
            receive from said at least one sensor, a first set of torque data for said first torque of each motor of said plurality of motors;
            determine an overall efficiency of said plurality of motors based on said first set of torque data; and
            selectively idle at least one motor of said plurality of motors based on a result of said determination of said overall efficiency of said plurality of motors.

2. The system of claim 1, wherein said one or more processors are further to:
    compare said first set of torque data with a torque efficiency map; and
    determine said overall efficiency of said plurality of motors based on a result of said comparison of said first set of torque data with said torque efficiency map.

3. The system of claim 1, wherein said one or more processors are further to:
   receive from said sensor, a second set of torque data for said plurality of motors, said second set of torque data obtained when at least one of said plurality of motors is at idle;
   compare said second set of torque data with said first set of torque data; and
   utilize a result of said comparison of said second set of torque data with said first set of torque data to determine an updated overall efficiency of said plurality of motors.

4. The system of claim 1, further comprising:
   an energy source configured to selectively provide power to each motor of said plurality of motors.

5. The system of claim 4, wherein said energy source is selected from a group consisting of: a battery, a fuel cell, or a combination thereof.

6. The system of claim 5, wherein said fuel cell is a hydrogen-electric fuel cell.

7. The system of claim 1, further comprising:
   a fuel cell stack configured to selectively provide power to each motor of said plurality of motors.

8. The system of claim 7, further comprising:
   a plurality of compressors configured to push compressed air to said fuel cell stack for conversion to electrical energy; and
   wherein said one or more processors are further to:
      determine an overall efficiency of said plurality of compressors; and
      selectively idle at least one of said plurality of compressors based on a result of said determination of said overall efficiency of said plurality of compressors.

9. A computer-implemented method for dynamically optimizing system efficiency for an integrated hydrogen-electric engine, said computer-implemented method comprising:
   receiving a first set of torque data for a first torque of each motor of a plurality of motors configured to drive an elongated shaft of said integrated hydrogen-electric engine;
   determining an overall efficiency of said plurality of motors based on said first set of torque data; and
   selectively idling at least one motor of said plurality of motors based on a result of said determination of said overall efficiency of said plurality of motors.

10. The computer-implemented method of claim 9, further comprising:
   receiving said first set of torque data for said first torque of each motor of said plurality of motors from a sensor.

11. The computer-implemented method of claim 9, further comprising:
   receiving a second set of torque data for said plurality of motors, said second set of torque data obtained when at least one of said plurality of motors is at idle;
   comparing said second set of torque data with said first set of torque data; and
   determining an updated overall efficiency of said plurality of motors based on a result of said comparison of said second set of torque data with said first set of torque data.

12. The computer-implemented method of claim 11, further comprising:
   selectively controlling a power from an energy source to each motor of said plurality of motors to selectively idle said at least one motor.

13. The computer-implemented method of claim 12, wherein said energy source is selected from a group consisting of: a battery, a fuel cell, or combinations thereof.

14. The computer-implemented method of claim 13, wherein said fuel cell includes a hydrogen-electric fuel cell.

15. The computer-implemented method of claim 11, further comprising:
   determining an overall efficiency of a plurality of compressors pushing compressed air to a fuel cell stack for conversion to electrical energy, wherein said fuel cell stack provides power to said plurality of motors; and
   selectively idling at least one compressor of said plurality of compressors based on a result of said determination of said overall efficiency of said plurality of compressors.

16. A non-transitory computer readable storage medium having computer readable program code stored thereon for causing a computer system to perform a method for dynamic optimization of system efficiency for an integrated hydrogen-electric engine, said method comprising:
   receiving a first set of torque data for a first torque of each motor of a plurality of motors configured to drive an elongated shaft of said integrated hydrogen-electric engine;
   determining an overall efficiency of said plurality of motors based on said first set of torque data; and
   selectively idling at least one motor of said plurality of motors based on a result of said determination of said overall efficiency of said plurality of motors.

17. The non-transitory computer readable storage medium of claim 16, further comprising:
   receiving said first set of torque data for said first torque of each motor of said plurality of motors from a sensor.

18. The non-transitory computer readable storage medium of claim 16, further comprising:
   receiving a second set of torque data for said plurality of motors, said second set of torque data obtained when at least one of said plurality of motors is at idle;
   comparing said second set of torque data with said first set of torque data; and
   determining an updated overall efficiency of said plurality of motors based on a result of said comparison of said second set of torque data with said first set of torque data.

19. The non-transitory computer readable storage medium of claim 16, further comprising:
   selectively controlling a power from an energy source to each motor of said plurality of motors to selectively idle said at least one motor, wherein said energy source is selected from a group consisting of: a battery, a fuel cell, or combinations thereof.

20. The non-transitory computer readable storage medium of claim 16, further comprising:
   determining an overall efficiency of a plurality of compressors pushing compressed air to a fuel cell stack for conversion to electrical energy, wherein said fuel cell stack provides power to said plurality of motors; and
   selectively idling at least one compressor of said plurality of compressors based on a result of said determination of said overall efficiency of said plurality of compressors.

\* \* \* \* \*